Oct. 19, 1965   J. HAGEMANN   3,213,410
CHANNEL NAVIGATING SYSTEM
Filed Jan. 28, 1955   2 Sheets-Sheet 1

INVENTOR
Julius Hagemann
BY George Sipkin
Rolla N. Carter
ATTORNEYS

Oct. 19, 1965        J. HAGEMANN        3,213,410

CHANNEL NAVIGATING SYSTEM

Filed Jan. 28, 1955        2 Sheets-Sheet 2

INVENTOR

Julius Hagemann

George Sipkin

Rolla N. Carter

ATTORNEYS

United States Patent Office 3,213,410
Patented Oct. 19, 1965

3,213,410
CHANNEL NAVIGATING SYSTEM
Julius Hagemann, 412 S. McArthur Ave.,
Panama City, Fla.
Filed Jan. 28, 1955, Ser. No. 484,857
4 Claims. (Cl. 340—5)
(Granted under Title 35, U.S. Code (1952), sec. 266)

The present invention relates to the navigation of restricted waters and more particularly to a navigational aid system with which a ship can be piloted along the entire extension of a channel and its instantaneous position in the channel can at all times be determined.

The navigation of a channel is always hazardous and the position of a ship in the channel is difficult to determine except at the few points which are adequately marked for this purpose. In time of war it is highly desirable that a channel in friendly waters can be safely navigated under all conditions of visibility and preferably by means which do not easily betray the channel's location to an enemy.

An object of the invention is to provide a channel navigation system with which a friendly pilot can at all times know his position in the channel.

Another object of the invention is to provide a channel marking system which requires no means visible above the water surface and which constitutes no obstacle to sweeping the channel if such becomes necessary.

Still another object of the invention is to utilize such a system to provide accurate navigational information over the entire extension of a channel which information is immediately and continuously available and can be stored and re-used as operationally required.

In accordance with the invention a plurality of underwater sonic markers arranged in a predetermined relation with a channel are adapted when triggered by a preselected sonic signal to transmit sound waves, the arrangement being such that each marker transmits at a frequency different from that of its immediate neighbors so that when a ship using the channel emits at regular intervals the preselected triggering signal all of the markers receiving a certain threshold signal will be activated, whereby for every triggering signal received the markers answer to provide at the ship signals whose frequencies and times of arrival contain information representative of the ship's position with respect to the answering markers. This information is extracted and presented in any usable form desired.

It is a feature of the invention that any one vessel saturates only a small section of the system so that different sections of the system may be used simultaneously.

Another feature of the invention is that the system is active so that its use by an enemy would invoke an increased risk, especially if the channel is properly patrolled.

The invention, both as to its organization and mode of operation, together with further objects and advantages thereof, will best be understood by reference to the following description when read in connection with the accompanying drawings in which FIG. 1 is a representation of a short length of a channel provided with navigational aids in accordance with the invention;

Figure 1:
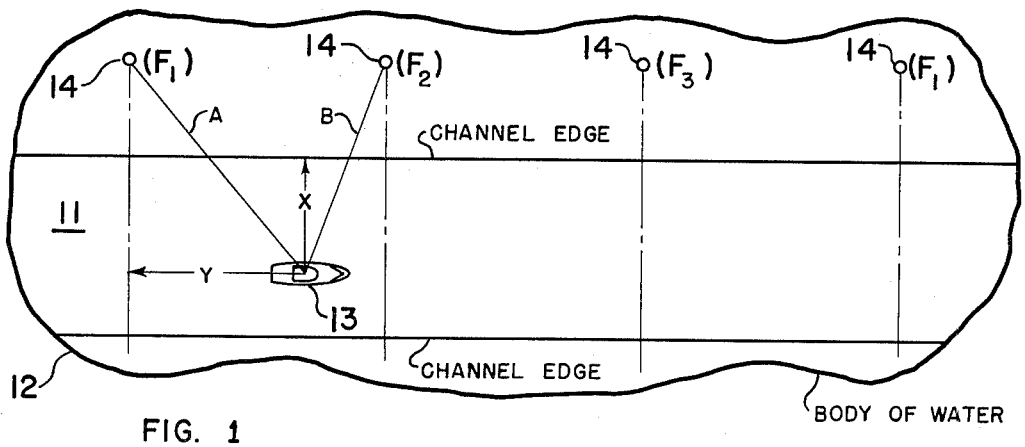

Referring now to FIG. 1 of the drawings, a system according to the invention is illustrated as applied to a section of a channel 11 extending through a body of water 12 shallow enough to be mineable and along which a vessel 13 is to be piloted. Sonic underwater markers 14, may be housed in sturdy steel spheres four or five feet in diameter, are securely anchored a few feet above the seabed in positions forming a preselected pattern with respect to the channel 11, e.g., spaced every five hundred yards along one side of and two hundred yards outside of the channel 11 which may be four hundred yards wide. These markers 14 are indicated as utilizing three different answering frequencies which are recurrently assigned to the markers 14 along the row as $f_1$, $f_2$, $f_3$, $f_1$, etc., so that the answering frequency of each marker 14 differs from the frequencies employed by its two neighbors.

Figure 2:
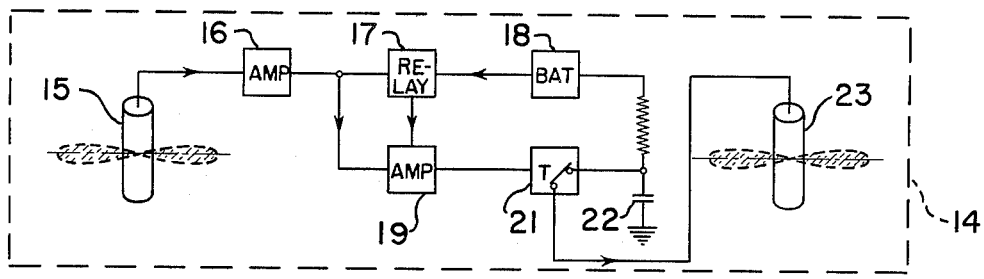
FIG. 2 is a block diagram of a system which may be employed in the navigational aids of FIG. 1.

One suitable answering or transponder circuit for the markers 14 is shown in FIG. 2 as comprising a receiver transducer 15 having a doughnut-shaped directivity pattern. A signal received by the transducer 15 is fed to a standby amplifier 16 which is selective to a certain triggering frequency and which is constructed to require a minimum of power to maintain itself in standby condition. Signals passed by the amplifier 16, when of sufficient strength, actuate a trigger and relay circuit 17 to connect a battery or other source of power 18 for energizing the rest of the transponder circuit so that it is kept continuously alive as long as sufficiently strong signals continue to arrive. Hence, every signal having the selected triggering frequency arriving at the transducer 15 will after passing amplifier 16 be further amplified by an amplifier 19 and employed to operate a transmitting relay 21 which functions to discharge a condenser 22 into a transmitting transducer 23 to cause it to emit a ping at its natural frequency which is made to be $f_1$, $f_2$, or $f_3$ as required.

Figure 3:
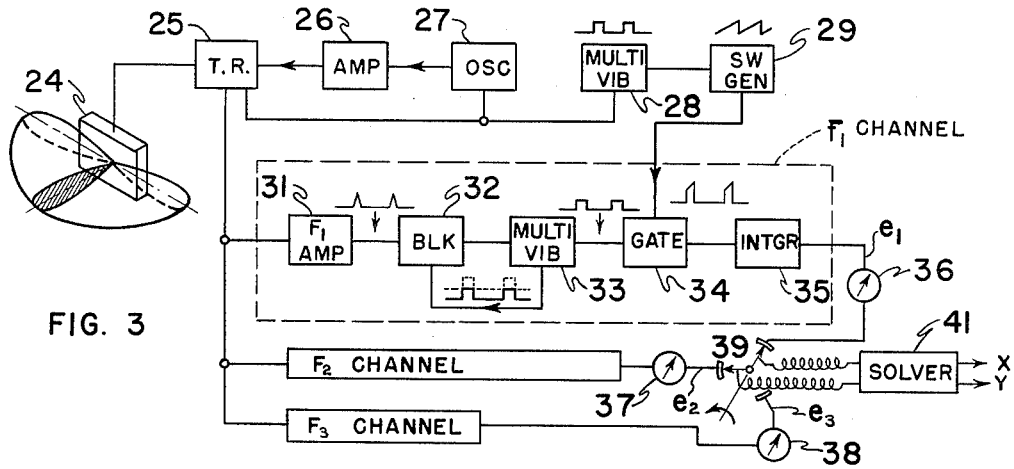
FIGS. 3 to 6 show schematically one embodiment of a shipborne apparatus suitable for making use of the navigational aids of FIG. 1.

The shipborne sonic equipment may be more or less conventional and is shown in FIG. 3 as including a transducer 24 which preferably has a directivity characteristic similar to a half doughnut, as indicated, so that by suitably positioning it forward of the ship the screw's noise will be shadowed by the hull. An incidental advantage of having a half doughnut pattern properly directed is that it removes any ambiguity as to which side of the ship the cooperating markers are located.

Still referring to FIG. 3, the transducer 24 is connected through a customary transmit-receive switch 25 and an amplifier 26 to the output of an oscillator 27 as controlled by a one-shot multivibrator 28 which in turn is triggered by a saw-tooth generator 29. Transmit-receive switch 25 functions in a normal manner to connect the transmitter 27 to the transducer 24 during the transmission of pulses and to disconnect the rest of the circuit shown. During the interim between the transmitted pulses, and while answering pulses from the transponders 14 are being received, the connections are reversed. It is to be understood that the oscillator 27 is so adjusted that the transmitted pulses are of the frequency to which the triggering circuits of the transponders 14 are set.

Figure 4:
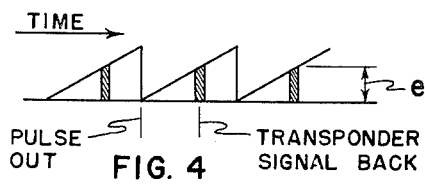

Answering signals from the transponders 14 received by the transducer 24 are fed through the TR box 25 to a receiver having (in this example) three channels separately selective to the three possible answering frequencies $f_1$, $f_2$, and $f_3$. Each of these three receiver channels has an amplifier 31 individually selective to one of the three transponder frequencies. The output of the amplifier 31 is fed through a blocking circuit 32, which passes only the initial signal during a repetition period, to a one-shot multivibrator 33 which provides gating signals normalized in length and height for an electronic gate 34 which cuts from the saw-tooth voltage inserted therein by the generator 29 pulses of constant width and of a height depending upon the time interval between the transmission of pulses and the receipt of the answering signals, this relation between height of pulse and elapsed time being indicated in FIG. 4. These constant width pulses are integrated and stored in a circuit 35 to provide an output voltage $e$ which is a measure for the instantaneous value of the distance (FIG. 1) between the transmitter on the ship 13 and the pertinent transponder marker 14. The voltages $e_1$, $e_2$, and $e_3$ appearing at the outputs of the respective channels $f_1$, $f_2$, and $f_3$ will be proportional to the distance of the vessel 13 from the pertinent markers 14.

It follows from the geometry of the system and the sawtooth wave employed that of the three output voltages $e_1$, $e_2$, and $e_3$ the two lower voltages represent the distances of the ship 13 from the two nearer markers 14, i.e., those marking the channel segment in which the ship 13 is at the time traveling. It may be well to note that the present discussion ignores the error (which is correctible) resulting from the ship's advance on its course during the transition time of the pulses. These voltages $e_1$, $e_2$, and $e_3$ may be indicated by suitable voltmeters 36, 37, and 38 and the two lower ones selected manually by a switch 39, or automatically in any well-known manner.

However accomplished, these two selected voltages are representative of the distances A and B (see FIG. 1), and when it is remembered that the distance between the markers 14 is five hundred yards it is readily apparent that these voltages contain all of the additional information needed for accurately locating the ship's position. It is preferable, however, to translate these voltages into the vernacular of the ship's navigator and this may be accomplished by inserting the voltages into a resolver (plus computer) 41 which in a known manner converts them to an output in the form of two voltages, two shaft positions or two shaft rates, representative of the coordinates $x$ and $y$ of a rectangular coordinate system which may be placed in suitable relation with the rectangular channel segment under consideration where, for instance, $x$ would be the distance from one channel edge and $y$ the distance longitudinally of the channel with respect to the edge of a segment. By known means these $x$ and $y$ values can be plotted, either by hand or by instruments, to provide a permanent record of the channel cruise segment by segment; other information such as might be obtained from mine locating gear aboard the vessel could be added by hand.

Figure 5:
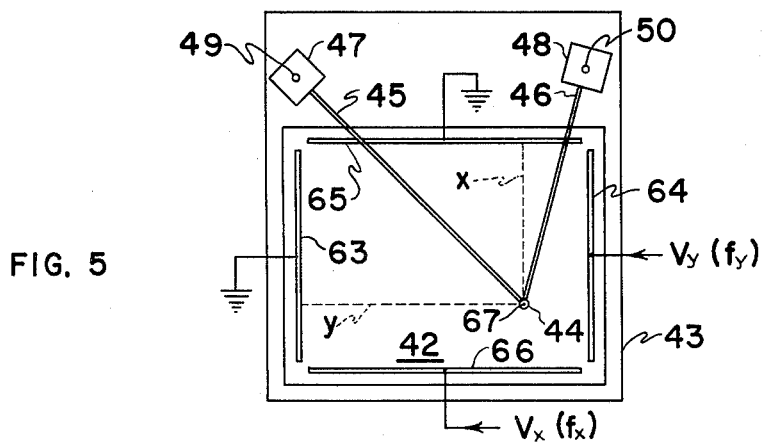
Figure 6:
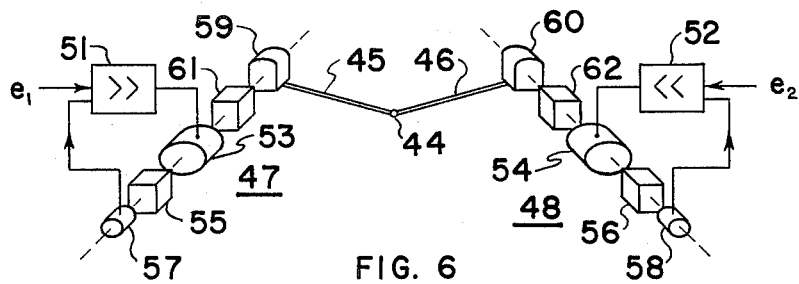

A novel computer and plotter incorporating the features of two known devices viz., two servo operated steel band reels and a sheet of conducting glass, is shown in FIG. 5 wherein a conducting glass sheet 42 is part of a plotter table 43. The conducting glass sheet 42 represents one channel segment and the ship is represented by a light carriage ("bug") 44 which is movable to any point on the glass surface by thin steel bands 45 and 46, adapted to be reeled in and out from two units 47 and 48, respectively, by means of servo motors and suitable gear trains contained therein as described in connection with FIG. 6, the units 47 and 48 being mounted for free rotation about vertical axes 49 and 50, respectively. These axes 49 and 50 represent and correspond to the respective positions of two corresponding transponder markers 14 (see FIG. 1). As shown in FIG. 6 the two reeling units 47 and 48 contain feed-back servo systems consisting of amplifiers 51 and 52, servo motors 53 and 54, gear trains 55 and 56, through which the servo motors 53 and 54 rotate compensating potentiometers 57 and 58, respectively. The servo motors 53 and 54 also drive the reels 59 and 60 of the steel bands 45 and 46 through gear trains 61 and 62. By feeding the output voltages $e_1$ and $e_2$ from the selector switch 39 (FIG. 3) into the servo amplifiers 51 and 52 the lengths of unreeled tapes 45 and 46 will at all times be proportional to the voltages $e_1$ and $e_2$ and thus are proportional to the instantaneous distances, A and B, of the ship from the markers 14 fathering the voltages $e_1$ and $e_2$.

The conversion of A and B into $x$ and $y$ is accomplished as follows: The conducting glass sheet 42 is fitted with two pairs of bars or line contacts 63, 64 and 65, 66. (These line contacts may be produced by using metal spraying techniques as in printed circuits.) These pairs of bars are supplied with two voltages $V_x$ and $V_y$ at two different frequencies $f_x$ and $f_y$. $V_x$ and $V_y$ are made to correspond, proportionally, to the width of the channel and to the length of one channel segment, respectively. The carriage 44 contains an insulated pin 67 which slides on and is in continuous contact with the surface of the conducting glass 42 and which therefore will pick up, at all times, two voltages $V_x$ and $V_y$ at the frequencies $f_x$ and $f_y$ which are proportional to the coordinates $x$ and $y$ which may be separated by suitable filters and processed or used as needed.

It will of course be appreciated that the apparatus just described contains all of the features needed for automatically plotting the ship's course, it being necessary merely to replace the insulated pin 67 with a suitable stylus and to place on the glass plate 42 or other support a chart of the pertinent channel segment drawn to the proper scale.

Figure 7:
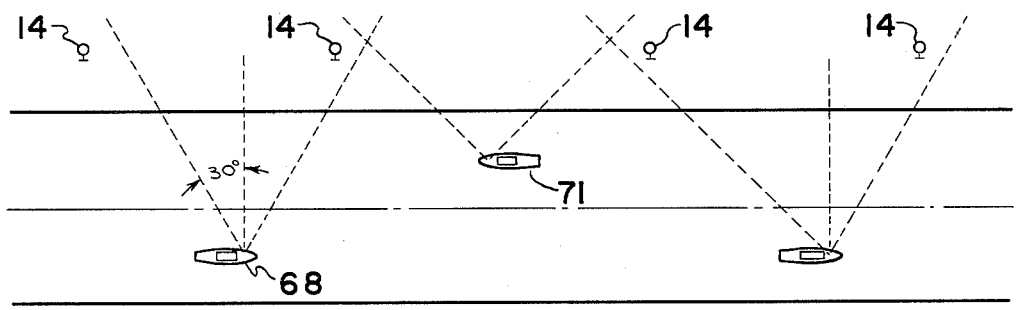
FIG. 7 illustrates the manner in which a simplified system can utilize such aids.
Figure 8:
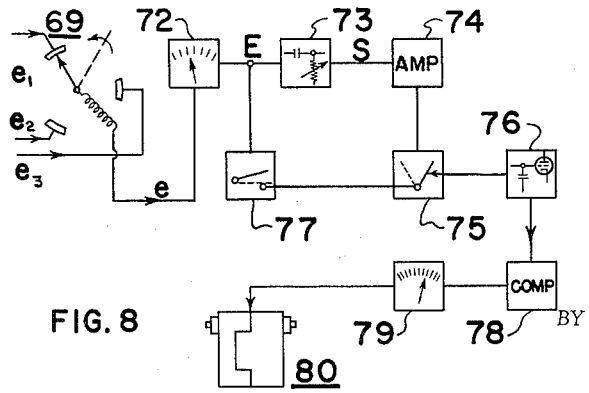
FIG. 8 shows how the shipborne apparatus may be modified to provide such a simplified system.

The ship's gear necessary to navigate the channel under normal conditions may be made less intricate, as it will only be necessary to provide sufficient information to enable the ship to stay within the channel boundaries. Thus, by giving the ship's transducer a transmitting and receiving directivity pattern subtending a half angle of 30° to 35° on either side of an axis normal to the ship's axis, the system is rendered less saturable (see FIG. 7). Also, by utilizing no more than one answering signal (preferably from the nearest marker) at a time the relatively simple arrangement shown in FIG. 8 may be employed for presenting sufficient information to meet the less stringent operational needs of ordinary channel users. As a ship 68 approaches and passes a marker 14 encompassed within its directivity pattern the output $e$ from the pertinent receiver channel selected by a switch 69 will steadily decrease, slowly go through a minimum and thereafter steadily increase. If the ship is close to the channel boundary nearer the row of markers a blind period will be experienced (see ship 71) during which the voltage $e$ will drop to zero until the next marker takes over. With a suitable amplifying meter 72, the voltage $e$ can be presented in terms of distance and since the minimum distance the ship approaches a marker is of most interest, this distance may be presented for use by the helmsman and recorded for history.

This may be accomplished by feeding the output voltage E from the amplifier 72 through a differentiator 73 and through an amplifier 74 into a sensitive relay 75, the contact of which is normally closed. Since the output signal S of the differentiator 73 will be proportional to the instantaneous value of the rate of change of E the relay 75 will only be closed when the signal S drops below a certain threshold value which will only occur when E goes through its minimum, i.e., when the ship 71 is at its closest approach to the marker, or if E becomes zero during a blind period. When the ship 71 is passing the marker the relay 75 closes to connect the voltage E to a storage circuit 76 through a normally open relay 77 which is held closed by the voltage E. A bridge and compensator circuit 78 serves to calibrate and adjust the readings of a centered meter 79 and a recorder 80 to show the actual position of the ship with respect to midchannel or the boundary of the channel. During a blind period when E becomes zero the relay 77, being de-energized, opens to interrupt the connections between the amplifier 72 and the relay 75, thereby preventing discharge of the storage circuit 76, and, therefore, the meter 79 and the recorder 80 stay deflected to the most recent minimum value of E.

While for the purpose of disclosing the invention preferred embodiments thereof have been described, it will be evident to those skilled in the art that various changes and modifications may be made therein without departing from the invention the scope of which is set forth in the appended claims.

The invention described herein may be manufactured and used by or for the Government of the United States of America for governmental purposes without the payment of any royalties thereon or therefor.

What is claimed is:

1. A channel defining system for aiding the navigation of a vessel through a body of water including a plurality of submerged sonic transponders equally spaced along the length of the channel and laterally displaced to one side of the center line of the channel by equal distances, each of said transponders including means for generating pulses of sound energy at a frequency which is different from that generated by either of its immediate neighboring transponders, and receiver means responsive to received sonic energy of a predetermined frequency for triggering its associated pulse generating means, the arrangement being such that every transponder receiving a supraliminal triggering pulse emits an answering pulse at its characteristic frequency.

2. In an apparatus for charting the position of a vessel in a channel defined in a predetermined manner by underwater sonic transponders which when activated by sound waves individually transmit sonic signals at a fixed frequency which is unique with respect to immediate neighboring transponders, vessel carried sound wave pulsing means for activating the transponders defining the segment of the channel occupied by the vessel, and position finding apparatus including receiver means responsive to the time intervals between each activating pulse and the first two sonic signals received for producing electrical quantities representative of the vessel's distances from the transponders supplying the said first two received signals, and a resolver computer coupled to the distance representing electrical quantities for deriving respectively signals proportional to the $x$ and $y$ rectangular coordinates of the vessel's position in the channel segment defined by the transponders supplying said first two received signals.

3. In an apparatus for charting the position of a vessel in a channel defined in a predetermined manner by underwater sonic transponders which when activated by sound waves individually transmit sonic signals at a fixed frequency which is unique with respect to immediate neighboring transponders, vessel carried sound wave pulsing means for activating the transponders defining the segment of the channel occupied by the vessel, and position indication apparatus including receiver means responsive to the time interval between each activating pulse and the first sonic signal received for producing a signal representative of the vessel's distance from the nearest transponder, and means responsive to said distance signal for supplying an indicating signal proportional to the rate of change in magnitude thereof.

4. In an apparatus for charting the position of a vessel in a channel defined in a predetermined manner by underwater sonic transponders which when activated by sound waves individually transmit sonic signals at a fixed frequency which is unique with respect to immediate neighboring transponders, vessel carried sound wave pulsing means for activating the transponders defining the segment of the channel occupied by the vessel, and position finding apparatus including receiver means responsive to the time intervals between each activating pulse and the first two sonic signals received for producing electrical quantities representative of the vessel's position in the channel, said receiver means including a plurality of channels separately selective to a different one of the several answering signal frequencies of the transponders employed, each of said channels including a blocking circuit for passing only one signal within the repetition period of the pulsing means, circuit means in each channel for normalizing the passed signal in length and height, and gating means actuated by the normalized signal for cutting from a saw-tooth voltage a pulse of constant width and of a height corresponding to the time interval between the sending of the activating pulse and the receipt of the answering signal.

References Cited by the Examiner

UNITED STATES PATENTS

| 684,706 | 10/01 | Mundy | 340—3 |
| 2,366,800 | 1/45 | Norrman | 340—3 X |
| 2,371,988 | 3/45 | Granqvist | 340—3 X |

FOREIGN PATENTS

| 18,753 | 1898 | Great Britain. |

CHESTER L. JUSTUS, *Primary Examiner.*

NORMAN H. EVANS, *Examiner.*